OR   3,982,810

United States Patent
Tamir et al.

[11] 3,982,810
[45] Sept. 28, 1976

[54] DIRECTIONAL RADIATION BY ASYMMETRICAL DIELECTRIC GRATINGS

[75] Inventors: Theodor Tamir, Teaneck, N.J.; Song-Tsuen Peng, Brooklyn, N.Y.

[73] Assignee: The United States of America as represented by the Secretary of the Navy, Washington, D.C.

[22] Filed: July 9, 1975

[21] Appl. No.: 594,416

[52] U.S. Cl. .................. 350/96 C; 350/96 WG; 350/162 R
[51] Int. Cl.² .................................. G02B 5/14
[58] Field of Search ......... 350/96 C, 96 WG, 162 R

[56] References Cited
UNITED STATES PATENTS

| | | |
|---|---|---|
| 3,674,336 | 7/1972 | Kogelnik .................. 350/96 C |
| 3,774,987 | 11/1973 | Boivin ..................... 350/162 R |
| 3,905,676 | 9/1975 | Ulrich ..................... 350/96 C |
| 3,912,363 | 10/1975 | Hammer .................. 350/162 R |

Primary Examiner—John K. Corbin
Assistant Examiner—Stewart Levy
Attorney, Agent, or Firm—R. S. Sciascia; L. I. Shrago; C. E. Vautrain, Jr.

[57] ABSTRACT

There is disclosed a technique whereby a dielectric grating disposed on a thin film that has a surface wave propagating thereon can concentrate the power from this wave into a beam that is either above or below the grating according to the profile of the grating. By this technique, surface waves traveling in different directions can be distinguished and the efficiency of optical beam couplers can be improved, among other applications.

10 Claims, 5 Drawing Figures

DIRECTIONAL RADIATION BY ASYMMETRICAL DIELECTRIC GRATINGS

The present invention concerns the directional blazing of waves and, more particularly, discriminating between optical surface waves that are incident on a dielectric grating.

There have recently been developed a wide variety of components and systems utilizing surface waves, e.g. delay lines, amplifiers, correlators and signal compressors. Thin-film structures currently in use in integrated optics are one example and consist typically of either multilayered or periodic grating configurations of the leaky-wave type. Attempts to enhance surface-wave-to-beam couplers have resulted in using either a slanted boundary in the substrate region, which is inconvenient, or a special value for the grating thickness which may unfavorably affect the value of the leakage parameter. The present invention is directed toward a novel grating structure which will improve the operation of these and other beam couplers and has potential application to other thin film devices.

Accordingly, it is an object of the present invention to provide asymmetric dielectric gratings having strong spatial discrimination.

Anothr object of this invention is to provide dielectric gratings which make it possible to discriminate between optical surface waves incident thereon.

A further object of this invention is to provide dielectric gratings which distinguish between energy coming from opposite directions by deflecting respective energies into the regions above or below the grating.

Other objects, advantages and novel features of the invention will become apparent from the following detailed description thereof when considered in conjunction with the accompanying drawings in which like numerals represent like parts throughout and wherein.

Blazing is the property whereby a grating can concentrate most of the energy from an incident wave into a non-specular diffraction order. The present invention, in general, is directed to a method of and means for producing a novel blazing effect which occurs when a surface wave, rather than a beam, is incident along a dielectric grating of the thin-film variety. By properly shaping its periodic profile, the thin-film dielectric grating can concentrate the power from an incident surface wave into a beam that appears selectively either above or below the grating. The waves are guided by an asymmetric grating profile which exhibits strong directional characteristics and can be used to selectively beam the energy into either one of two regions.

Figure 1:
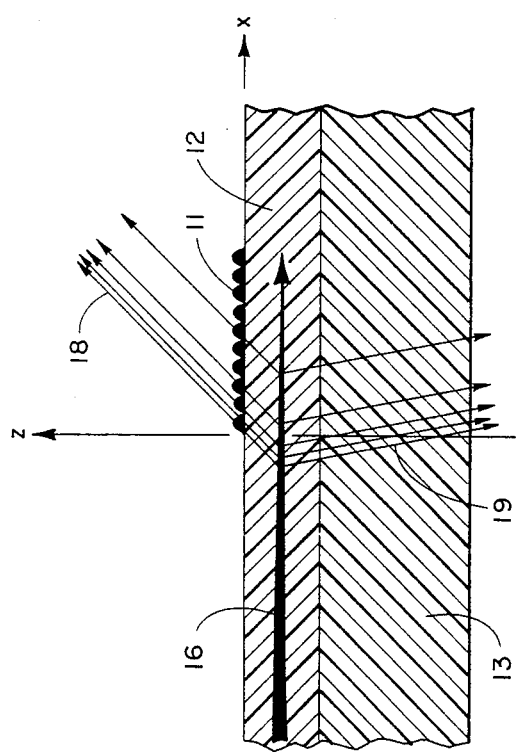
FIG. 1 is a schematic diagram illustrating the conventional conversion of a surface wave into leaky-wave beams.

Referring to FIG. 1, a conventional thin-film dielectric grating 11 is shown mounted on a dielectric film 12 which in turn is mounted on a dielectric substrate 13. An incident surface wave indicated by arrow 16 is directed along film 12 and is converted into a leaky wave that radiates one or more outgoing beams indicated by arrows 18 in one direction out of film 12 and a like amount of beams indicated by arrows 19 in a divergent direction into the substrate. Where grating 11 is a uniform grating, or in any event is not constructed according to the teachings of the present invention, the incident energy in the form of beam 16 is partitioned substantially equally between beams 18 which are directed into air or some other medium above film 12 and beams 19 which are directed into substrate 13. Beams 18 and 19 are inclined with respect to the normal to the grating at angles $\nu_\eta$ given by:

$$k_0 \sqrt{\epsilon_j} \sin\theta_\eta^{(j)} = \beta_\eta = \beta_0 + \frac{2\eta\pi}{d} \quad (1)$$

where $\eta = 0, \pm 1, \pm 2, \ldots, j = a, s$ designates the upper, e.g. air, or lower, e.g. substrate, regions, respectively, $\epsilon_j$ is the relative permittivity of the jth medium and $k_0 = 2\pi/\lambda$ is the plane-wave propagation factor in vacuum. Here d is the periodicity length and $\beta_0$ is the fundamental wavenumber of the leaky wave, which is usually very closely equal to the wavenumber $\beta_{sw}$ of the incident surface wave. By properly choosing $\beta_0$, d and $\lambda$, it is possible to satisfy equation (1) so that only a single value of $\eta$, i.e. either $\eta = -1$ or $+1$, yields a real angle $\theta_\eta^{(j)}$. A single beam is then radiated in each of the two unbounded regions above and below the grating as shown in FIG. 1.

Figure 2:
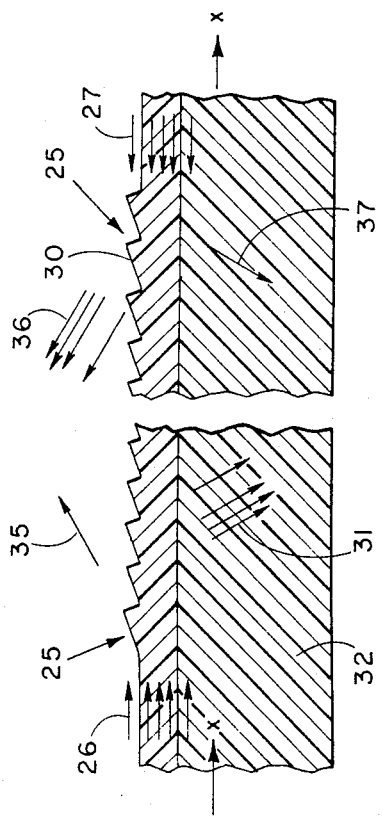
FIG. 2 is a sectional view of one embodiment of a dielectric grating of the present invention having an asymmetric profile.

FIG. 2 illustrates one embodiment of the invention in which the grating provides means for discriminating between the regions above and below the wave-carrying thin film. Such discrimination in this embodiment is accomplished by a serrated dielectric grating 25 into which a pair of opposing beams 26 and 27 may be individually or simultaneously directed. Grating 25 is given an asymmetric profile which in this embodiment is in the form of a plurality of non-symmetrical peaks 30 which have the effect of asymmetrically dividing beam 26 into a stronger beam 31 diverted into a dielectric substrate 32 on which grating 25 is mounted and a weaker beam 35 into the region above the grating. Incident light from the opposing direction, however, is divided by the grating into a stronger beam 36 into the region above the grating and a weaker beam 37 into substrate 32.

The foregoing division of beams 26 and 27 into unequal components is accounted for in the following manner. In the light incident from the left, i.e. beam 26 along the $+x$ axis, the electric field in an air region above grating 25 can be written as:

$$E_a = \sum_\eta \alpha_\eta \exp\{i(k_{x\eta} X + k_{z\eta}^{(a)} z)\}, \quad z > t_a \quad (2)$$

whereas the electric field in the substrate is given similarly by:

$$E_s = \sum_\eta s_\eta \exp\{i(k_{x\eta} X - k_{z\eta}^{(s)} z)\}, \quad z < -t_r \quad (3)$$

where a time dependence exp $(-i\omega t)$ is implied and omitted. Here $\alpha_\eta$ and $s_\eta$ are functions of $k_{x0}$, with:

$$k_{x\eta} = \beta_\eta + i\alpha_\eta \qquad (4)$$

$$k_{z\eta}^{(j)} = \pm (k_0^2 \epsilon_j - k_{x\eta}^2)^{1/2}, \qquad (5)$$

where $\alpha$ denotes the attenuation due to the leakage of energy into the exterior regions, and the sign for $k_{z\eta}^{(j)}$ in equation (4) is given by a radiation condition. The foregoing applies to the condition where a beam is incident along the $+x$ direction only such as beam 26 in FIG. 2.

Where a light beam is incident along the $-x$ direction such as beam 27 in FIG. 2, the electric field in the air region above the grating can be found from equations (2) and (3) by merely changing $k_{x\eta}$ into $-k_{x\eta}$. In the process, $\alpha_\eta = \alpha_\eta (k_{x0})$ and $s_\eta = s_\eta (k_{x0})$ and changed to $\alpha_\eta (-k_{x0})$ and $s_\eta (-k_{x0})$, respectively. If the function $h(x,z) = h(x+d,z)$ describing the grating profile satisfies a reflection-symmetry condition $h(x,z) = h(-x,z)$, we then also have $\alpha_\eta (-k_{x0}) = \alpha_{-\eta} (k_{x0})$ and $s_\eta (-k_{x0}) = s_{-\eta} (k_{x0})$. Hence for symmetric gratings, incidence from either right or left yields exactly the same relative distribution of the various space harmonics. However, for asymmetric profiles, i.e., $h(x,z) \neq h(-x,z)$, the foregoing equalities between the space-harmonic amplitudes do not hold. The composition of a wave guided along the $+x$ direction is then different from that of a wave having the same values of $k_{x\eta}$, but guided along the $-x$ direction.

In the case of the beam incident along the $-x$ direction, it is assumed that only one beam is leaked into each of the two open regions, i.e. above and below grating 25. Hence only one $\alpha_\eta$ and one $s_\eta$ refer to space harmonics that radiate away from the grating, whereas all of the other harmonics decay away along a perpendicular direction ($+z$ or $-z$, for $\alpha_\eta$ or $s_\eta$, respectively). For beam 26, the radiating harmonics have amplitudes $\alpha_{-1} (k_{x0})$ and $s_{-1} (k_{x0})$, whose magnitudes $|\alpha_{-1} (k_{x0})|^2$ and $|s_{-1} (k_{x0})|^2$ are proportional to the intensities of the outgoing beams in the air and substrate regions, respectively. For beam 27, the radiating harmonics have amplitudes $\alpha_1 (-k_{x0})$ and $s_1 (-k_{x0})$. Because $\alpha_1 (-k_{x0}) \neq \alpha_{-1} (k_{x0})$ and $s_1 (-k_{x0}) \neq s_{-1} (k_{x0})$, the partitioning of the incident energy between the beams in the air and substrate regions is generally different in the two cases. It is, therefore, noted that incidence from the left produces a stronger beam in the substrate, as indicated in beam 31, whereas incidence from the right accounts for a stronger beam in the air region, as indicated in beam 36.

Figure 3:
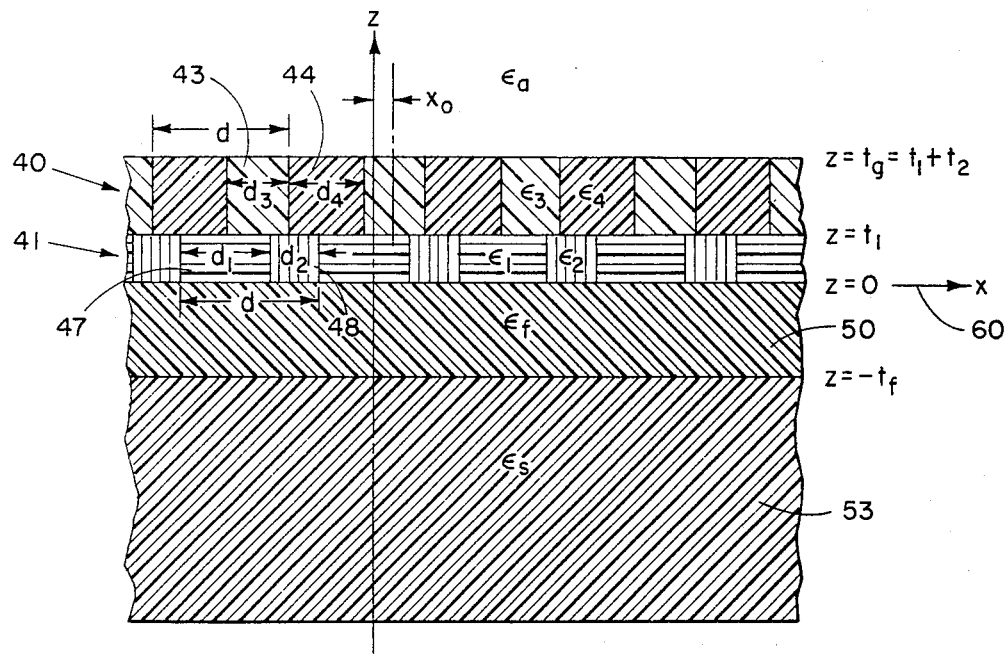
FIG. 3 is a sectional schematic drawing of an alternate embodiment of the invention having greater flexibility of structure than the embodiment of FIG. 2.
Figure 4:
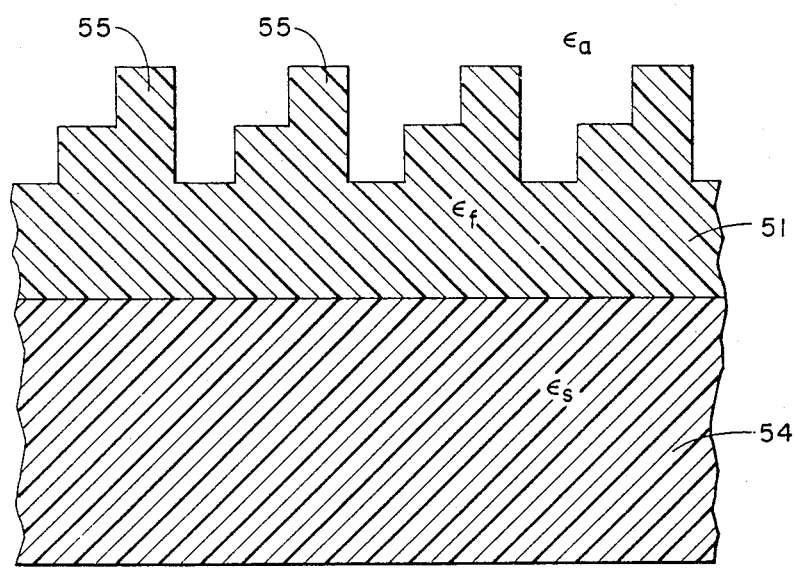
FIG. 4 is a sectional view of a further dielectric grating of the invention.

FIG. 3 is a sectional view of a dielectric grating made according to the present invention which provides selective guided-wave performance by its asymmetric profile. It will be appreciated that the functional results of this configuration may be achieved through other asymmetric profiles such as a triangular profile. FIG. 4 is a sectional view of the equivalent of such a triangular profile.

The analysis of the structure in FIG. 3 is based upon the fact that the grating profile chosen consists of two adjacent periodic dielectric layers 40 and 41, each layer consisting of periodic cells having different rectangular shapes, but with both layers exhibiting the same periodicity length $d$. Specifically, layer 40 consists of a succession of cells 43 and 44, identified as $d_3$ and $d_4$ respectively, while layer 41 consists of a succession of cells 47 and 48 which are identified as $d_1$ and $d_2$, respectively. Any two adjacent cells in layer 40 or in layer 41 have a common total length which is identified as $d$. The leaky waves guided by the composite grating of FIG. 3 can be found by a straightforward extension of the theory for a single periodic layer with rectangular profile.

The field in film layer 40, i.e. $-t_f < z < 0$, is found by using equations (1), (4) and (5) with $j = f$, for film, and writing:

$$E_f = \sum_\eta \{ f_\eta^{(+)} \exp(ik_{z\eta}^{(f)} z) + f_\eta^{(-)} \exp(-ik_{z\eta}^{(f)} z) \} \exp(ik_{x\eta} x), \qquad (6)$$

where $f_\eta^{(+)}$ and $f_\eta^{(-)}$ refer to amplitudes of waves progressing along $+z$ and $-z$, respectively.

In the two periodic layers, the electric and magnetic fields are given by:

$$E_g^{(\iota)} = \sum_m \{ g_m^{(\iota+)} \exp(ik_{zm}^{(\iota)} z) + g_m^{(\iota-)} \exp(-ik_{zm}^{(\iota)} z) \}$$

$$\cdot \sum_\eta V_{m\eta}^{(\iota)} \exp(ik_{x\eta} x) \qquad (7)$$

$$H_g^{(\iota)} = \sum_m \{ g_m^{(\iota+)} \exp(ik_{zm}^{(\iota)} z) - g_m^{(\iota-)} \exp(ik_{z(m)}^{(\iota)} z) \}$$

$$\cdot \sum_\eta I_{m\eta}^{(\iota)} \exp(ik_{x\eta} x) \qquad (8)$$

where $m, \eta = 0, \pm 1, \pm 2, \ldots$ and the superscript $\iota$ refers to either the lower region ($\iota = 1, 0 < Z < t_1$) or the upper region ($\iota = 2, t_1 < Z < t_g = t_1 + t_2$) of the composite grating layer. All coefficients $V_{m\eta}^{(\iota)}$ and wavenumbers $k_m^{(\iota)}$ are known because, for every given $m$, equation (7) represents a characteristic solution within a medium whose permittivity alternates periodically between two fixed values. By virtue of Maxwell's equations, $I_{m\eta}^{(\iota)}$ in equation (8) is related to $V_{m\eta}^{(\iota)}$, so that the only unknown quantities in equations (7) and (8) are the modal amplitudes $g_m^{(\iota+)}$.

It may now be assumed that all fields in equations (2), (3), (7) and (8) denote transverse components that are parallel to the xy plane. Because the given configuration is assumed to be invariant with respect to the y coordinate, the problem can be separated into TE modes, i.e. perpendicular polarization with $E=E_y$ and $H=H_x$, and TM modes, i.e. parallel polarization with $E=E_x$ and $H=H_y$. In both cases, $H_x$ and $H_y$ can be found by applying Maxwell's equations to equations (2) and (3). Thereafter, the appropriate field components may be matched at the boundaries $z = -t_f, 0, t_1$ and $t_g$ and thus eliminate five out of the six unknown sets $s_\eta$, $f_\eta^{(\pm)}$, $g_m^{(\pm)}$ and $\alpha_\eta$. By using matrix algebra, the unknown quantities may be expressed in terms of $f_\eta^{(+)}$, which are then found to satisfy:

$$S_f f^{(+)} = \{1 - exp(i2K_f t_f) R_f \hat{R}_0\} f^{(+)} = 0, \quad 9.$$

where $S_f$ is an infinite square matrix defined by the expression in the outer brackets. In the above, $f^{(+)}$ is a column vector with elements $f_\eta^{+}$, $I$ is the unit matrix, and $exp(i2K_f t_f)$ denotes a diagonal matrix with elements $\delta_{m\eta} exp(i2k_{z\eta}^{(f)} t_f)$. Here $R_f$ is a diagonal matrix with elements $\delta_{m\eta} \rho_\eta$ . with:

$$\rho_\eta = \frac{Y_\eta^{(f)} - Y_\eta^{(s)}}{Y_\eta^{(f)} + Y_\eta^{(s)}}. \quad (10)$$

where $Y_\eta^{(j)}$ is a characteristic admittance in the $j$th medium ($j = a, s,$ or $f$), given by:

$$Y_\eta^{(j)} = \begin{cases} k_{z\eta}^{(j)} /\omega\mu_0, & \text{for TE modes;} \\ \omega\epsilon_0\epsilon_j/k_{z\eta}^{(j)}, & \text{for TM modes.} \end{cases} \quad (11)$$

In addition, $\hat{R}_0$ is an infinite square matrix:

$$\hat{R}_0 = (Y_f + Y_0)^{-1}(Y_f - Y_0), \quad 12.$$

where $Y_f$ is a diagonal matrix with elements $\delta_{m\eta} Y_\eta^{(f)}$, while $Y_0$ is an input admittance matrix defined by:

$$Y_0 = \{V_1[1 + exp(iK_1 t_1) R_1 exp(ik_1 t_1)]\}^{-1} \cdot \{I_1[1 - exp(iK_1 t_1) R_1 exp(iK_1 t_1)]\}, \quad 13.$$

where:

$$R_1 = (I_1 + Y_1 V_1)^{-1}(I_1 - Y_1 V_1), \quad 14.$$

$$Y_1 = \{V_2[1 + exp(iK_2 t_2) R_2 exp(iK_2 t_2)]\}^{-1} \cdot \{I_2[1 - exp(iK_2 t_2) R_2 exp(iK_2 t_2)]\}, \quad 15.$$

$$R_2 = (I_2 + Y_a V_2)^{-1}(I_2 - Y_a V_2). \quad 16.$$

Here $V_\iota$ and $I_\iota$ are square matrices with elements given by:

$$(V_\iota)_{\eta m} = V_{m\eta}^{(\iota)} \text{ and } (I_\iota)_{\eta m} = I_{m\eta}^{(\iota)} \quad 17.$$

whereas $exp(iK_\iota t_\iota)$ are diagonal matrices with elements $\delta_{m\eta} exp(ik_m^{(\iota)} t_\iota)$, with $\iota = 1, 2$.

By virtue of equations (10) to (17), relation (9) is fully defined and yields non-zero values of $f_\eta^{(+)}$ only if the determinant of $S_f$ vanishes.

Hence:

$$det(s_f) = 0, \quad 18.$$

represents the dispersion relation for the given problem. By using a judicious truncation of $S_f$, the eigenvalue $k_{x0} = \beta_0 + i\alpha$ can be found via a computer calculation. This $k_{x0}$, in turn, can then be inserted into equation (9) to find $f_\eta^{(+)}$; all $f_\eta^{(-)}$, $\alpha_\eta$ and $s_\eta$ can thereafter be determined.

In FIGS. 3 and 4, the permittivities of the various films, substrates and other layers of material are indicated as $\epsilon_f$ for dielectric film layers 50 in FIG. 3 and 51 in FIG. 4. $\epsilon_s$ represents the permittivity for dielectric substrates 53 in FIG. 3 and 54 in FIG. 4, while $\epsilon_1 - \epsilon_4$ represents the permittivities of the dissimilar materials forming the dielectric grating in FIG. 3. It should be noted again that periodic layers 40 and 41 form the dielectric grating in FIG. 3, producing a composite grating whose profile may be varied by varying the materials in each of the cells therein. The dielectric grating in FIG. 4 is a simplified arrangement of that in FIG. 3 wherein a plurality of asymmetrical peaks 55 serve as a second approximation to a triangular profile. Peaks 55 and rows of cells 40 and 41 act on incident beams in the manner shown in FIG. 2 for beams approaching from the left such as beam 26 and beams approaching from the right such as beam 27.

The structure shown in FIG. 3 is provided with a high degree of flexibility since the profile of the composite grating formed by layers 40 and 41 can be altered continuously by laterally shifting the top periodic layer 40 along the x axis which is indicated at 60. Two positions then exist, i.e. for conditions of $x_0 = 0$ and $x_0 = \frac{1}{2}d$, that yield symmetric profiles, but any other value of the distance $x_0$ leads to asymmetric profiles. The length $x_0$ can therefore be taken as an asymmetry parameter, which is put into evidence by writing:

$$V_{m\eta}^{(2)} = \bar{V}_{m\eta}^{(2)} exp(-ik_{x\eta} x_0). \quad 19.$$

By taking $x_0$ as a variable, all $V_{m\eta}^{(2)}$ can then be expressed in terms of simple phase shifts with respect to $\bar{V}_{m\eta}^{(2)}$, which refer to the symmetric case $x_0 = 0$. Of course, a relation similar to equation (19) holds for $I_{m\eta}^{(2)}$.

Figure 5:
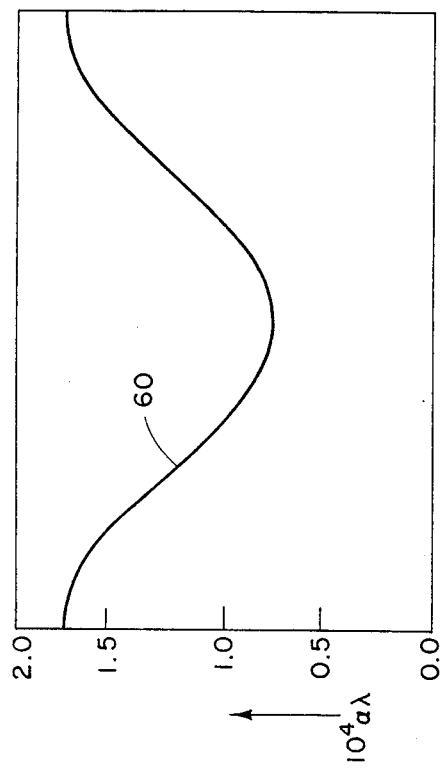
FIG. 5 presents a graphical comparison of the variation of leakage and efficiency in relation to lateral shifting of the top periodic layer of the embodiment of FIG. 3.
Figure 5:
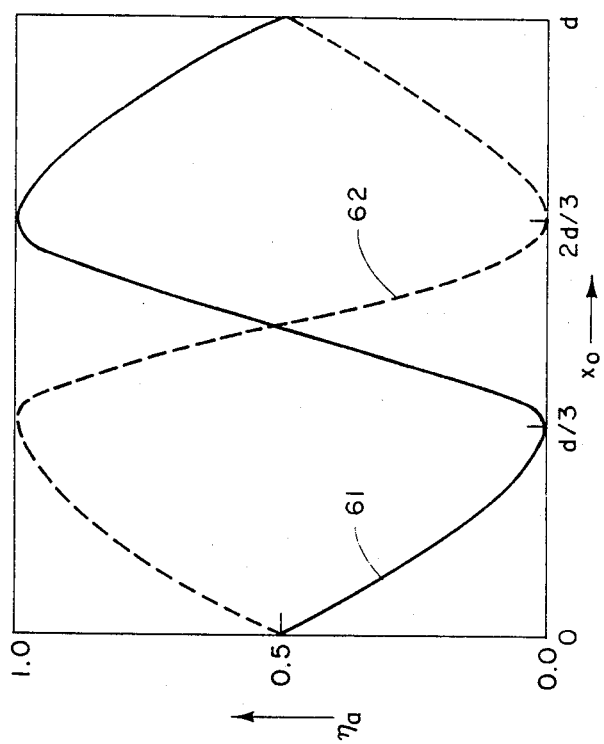

FIG. 5 shows the results of a calculation for the asymmetric grating of FIG. 3 where $\alpha$ and the efficiency $$\eta_a \propto 1^2$$

are shown as $x_0$ varies from 0 to $\frac{1}{2}d$. As seen therein, the curve for 60, shows the variation of normalized leakage $\alpha\lambda$ as a function of $x_0$ and $\alpha$, has extrema for $x_0 = 0, \frac{1}{2}d$ and $d$, which correspond to symmetric profiles. Also, $\alpha$ is independent of the direction of propagation along $\pm x$, which is expected because of the eigenvalue $k_{x0}$ is not dependent on the direction of propagation along $\pm x$. However, the efficiency $\eta_a$ for converting the incident energy into a beam in the air region depends very strongly on the propagation direction as is indicated by curves 61 and 62 which represent variations of efficiency $\eta_a$ as a function of $x_0$ for incidence along the $+x$ and $-x$ directions, respectively. Thus, maximum power discrimination between the air and substrate regions occurs if $x_0 = \frac{1}{8}d$ or $\frac{3}{8}d$, for which cases the profile is most asymmetric. All three curves in FIG. 5 are for the $TM_0$ mode in a grating such as that shown in FIG. 3, with $\epsilon_a = 1$, $\epsilon_1 = \epsilon_3 = 2.2$, $\epsilon_2 = \epsilon_4 = 1.8$, $\epsilon_f = 3.0$, $\epsilon_s = 2.3$, $t_1 = t_2 = \frac{1}{2}t_g = d/\tau, t_f = t_g$, $d_2 = 2d_1 = 2d_4 = d_3$ and $d = 0.55 \lambda$. As assumed in FIG. 2, the case shown in FIG. 5 refers to a situation where a single beam can be excited in each of the two open air and substrate regions. Thus, if $\eta_s$ is the efficiency of conversion of the substrate beam, we have $\eta_a + \eta_s = 1$ for this two-beams case.

It is noted that nearly all of the energy goes into the air beam, i.e. $\eta_a \approx 1$, if $x_0 = \frac{2}{3}d$ in FIG. 5 and incidence is from the left, whereas nearly all of this energy goes into the substrate beam, $\eta_a \approx 0$, for the same $x_0$ when incidence is from the right. Such a behavior is of particular interest to integrated-optics applications. Thus, in the case of surface-wave-to-beam couplers, it is usually desired to enhance the air beam at the expense of the substrate beam. Previous schemes for achieving such a result have used either a slanted boundary in the substrate region, which is inconvenient, or a special value for the grating thickness, which may unfavorably affect the value of the leakage parameter $\alpha$. The choice of an asymmetric profile as provided herein offers a solution that does not exhibit these disadvantages.

The present invention thus provides a method and means for producing strong blazing effects on guided-wave fields through the relatively simple expedient of providing in one form or another a dielectric grating having an asymmetric profile. The extent of the asymmetry of the profile has a direct effect on the discrimination or separation between the two $\pm x$ directions along the grating. Strong discrimination can be used to improve the operation of beam couplers and also to operate as a direction-discriminating device. The device can further be used as a coupler between integrated optic circuits and layer sources, with the density or concentration of the coupling beam varied as desired within certain limits, of course, in the embodiment of FIG. 3 or its equivalent. The invention has further utility in surface wave devices such as delay lines, correlators, etc. which employ this technology.

Obviously many modifications and variations of the present invention are possible in the light of the above teachings.

What is claimed is:

1. An optical device for concentrating an incident surface wave into beams leaked selectively either above or below the grating of the device comprising:
   a thin film dielectric grating which includes a film of dielectric material disposed on a dielectric substrate, said film having a maximum thickness so as to be capable of guiding a wave of optical electromagnetic radiation therewithin;
   means for producing and directing waves of optical electromagnetic radiation in $+x$ or $-x$ directions simultaneously in said film, said film having a centrally disposed grating region; and
   asymmetrically shaped protrusions in the grating region of said film extending above said minimum thickness so that surface waves entering said grating region will be leaked and substantially concentrated into beams diverging at selected angles out of said film,
   said grating protrusions configured so as to leak surface waves incident in the $+x$ direction in beams into said substrate and in the $-x$ direction in beams into the region above said film remote from said substrate.

2. A method of concentrating the power in a thin film optical device from an incident surface wave into a beam that appears selectively either above or below the dielectric grating of the device comprising:
   discriminating between the regions above and below the grating by introducing an asymmetric profile in the grating;
   said asymmetric profile selected so as to concentrate energy incident from one direction in said film in a beam leaked into the region above the grating and from the opposite direction in a beam leaked into the region below the grating.

3. The method of claim 2 wherein substantially all of the energy in the wave incident in the $+x$ or $-x$ direction is concentrated in leaked beams by adjusting the repetitive length parameter of the grating asymmetry to two-thirds the maximum unit length which yields symmetric beam distribution.

4. A thin film optical device for discriminating between and concentrating surface waves incident in and propagating in said device comprising:
   a dielectric substrate having a dielectric thin film guide disposed thereon and dielectric grating means disposed on said film guide;
   means for producing and directing waves of optical electromagnetic radiation in opposite directions in said film guide,
   said grating means adapted to form and forming an asymmetric grating profile so that surface waves in the adjacent region of said film guide are selectively leaked out of said film guide in beam form diverging therefrom into said substrate for waves proceeding in one direction and away from said substrate for waves proceeding in the opposite direction to said one direction.

5. The optical device of claim 4 wherein said grating means includes a plurality of cells of dielectric material disposed transverse to the longitudinal axis of said film guide and selectively positionable to produce a plurality of asymmetric grating profiles whereby leaked waves may be selectively guided into regions above and below said film guide.

6. The optical device of claim 5 wherein said plurality of cells are deployed periodically in at least two adjacent layers in said grating means,
   said cells in each layer alternating in size and no two cells having the same dimension in said one direction.

7. The optical device of claim 6 wherein any two adjacent cells in each layer have a common total dimension in said one direction.

8. The optical device of claim 7 wherein said cells are rectangular in cross section so that the grating profile is formed of two adjacent periodic layers of cells with each layer having periodic cells with different rectangular shapes while both layers have the same periodicity length.

9. The optical device of claim 8 wherein the composite grating formed as said grating means may be altered continuously by laterally shifting the upper of said layers of cells in the $+x$ and $-x$ directions so that for said dimensions of 0 and $0.55\lambda/2$ symmetric profiles are obtained and for other of said dimensions asymmetric profiles are obtained.

10. The optical device of claim 9 wherein said dimension is identified as the asymmetry parameter in said device and is expressed mathematically as $$V_{m\eta}{}^{(2)} = \overline{V}_{m\eta}{}^{(2)} exp(ik_{x\eta} x_0)$$

where $x_0$ represents various values of said dimension and $V_{m\eta}{}^{(2)}$ represents simple phase shifts with respect to $\overline{V}_{m\eta}{}^{(2)}$ which refer to the symmetric condition of $x_0 = 0$.

* * * * *